(12) United States Patent
Nakamura

(10) Patent No.: US 6,542,255 B1
(45) Date of Patent: Apr. 1, 2003

(54) IMAGE FORMATION APPARATUS AND METHOD

(75) Inventor: Koji Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/511,916

(22) Filed: Feb. 23, 2000

(30) Foreign Application Priority Data

Feb. 24, 1999 (JP) .............................. 11-045908

(51) Int. Cl.[7] .............................................. G06F 13/00
(52) U.S. Cl. .................... 358/1.17; 358/1.16; 358/1.18; 358/501; 358/507
(58) Field of Search ........................... 358/1.1, 1.2, 1.5, 358/1.9, 1.12, 1.14, 1.15, 1.16, 1.17, 1.18, 501, 507, 509

(56) References Cited

U.S. PATENT DOCUMENTS 5,991,515 A * 11/1999 Fall et al. ................... 358/1.15
6,084,687 A * 7/2000 Miyazaki et al. .......... 358/1.17

FOREIGN PATENT DOCUMENTS

| JP | 5-16443 | 1/1993 |
| JP | 5-16592 | 1/1993 |
| JP | 6-12199 | 1/1994 |
| JP | 7-195760 A | 8/1995 |
| JP | 7-195760 | 8/1995 |
| JP | 9-164731 A | 6/1997 |
| JP | 9-174958 A | 7/1997 |
| JP | 10-260801 A | 9/1998 |
| JP | 11-31052 A | 2/1999 |
| JP | 11-129555 A | 5/1999 |
| JP | 2000-163230 A | 6/2000 |

* cited by examiner

*Primary Examiner*—Mark Wallerson
(74) *Attorney, Agent, or Firm*—Foley & Lardner

(57) ABSTRACT

An image formation apparatus comprises a drawing instruction analyzer which stores the drawing position and the drawing area size of a display list into a list table when the display list is created and a band distributing unit which references the list table after the display lists for one page are created, temporarily determines the height of each band, calculates the total of the drawing sizes of the display lists included in the band height, determines the band height so that the total is equal to or smaller than a predetermined threshold and, based on the determined band heights, distributes the display lists for one page to a plurality of bands.

11 Claims, 9 Drawing Sheets

| DISPLAY LIST NO. | DRAWING TYPE | DRAWING START Y-COORDINATE | DRAWING RECTANGLE |
|---|---|---|---|
| 1 | CHARACTER | 25 | 2500 |
| 2 | BIT MAP | 60 | 100 |
| 3 | STRAIGHT LINE | 70 | 50 |
| 4 | CHARACTER | 150 | 4000 |
| 5 | POLYGON | 120 | 200 |
| | | | |
| | | | |
| | | | |

FIG.8

| Y-COORDINATE VALUE | GRAPHIC PRESENCE FLAG |
|---|---|
| 1 | 0 |
| ⋮ | ⋮ |
| 4 | 0 |
| 5 | 1 |
| ⋮ | ⋮ |
| 20 | 1 |
| 21 | 0 |
| ⋮ | ⋮ |
| 24 | 0 |
| 25 | 1 |
| ⋮ | ⋮ |
| 40 | 1 |
| 41 | 0 |
| ⋮ | ⋮ |

IMAGE FORMATION APPARATUS AND METHOD

BACKGROUND OF THE INVENTION

1. Field of the Invention

The present invention relates to an image formation apparatus and method, and more particularly to an image formation apparatus and method which divide the drawing instructions for one page into a plurality of bands and performs image development sequentially, one band at a time.

2. Description of the Related Art

A conventional image formation apparatus of this type, especially a printer capable of printing images in full color, requires a large amount of memory to store therein the drawing instructions and the image data for one page. For this reason, the printer divides a page into a plurality of areas (hereinafter called bands) and sequentially develops the image of the bands to reduce required memory.

Conventionally, the height of a band, set up by a printer driver which divides a page into a plurality of bands for image development processing, is fixed by the memory amount or the number of gradations of a printer, regardless of the amount of drawing data contained in the band. Thus, the development speed depends largely on how dense the drawing data in a band is. In addition, because all bands have the same height, the printer driver designed for use on a color printer requires a monochrome printer to reserve more memory than is actually needed.

To solve this problem, a method of making the height of a band variable is disclosed in Japanese Patent Laid-Open Publication No. Hei 7-195760. That is, when bit-development command data created from code data transferred from the host computer is developed into a bit map for each band, the technology disclosed in Japanese Patent Laid-Open Publication No. Hei 7-195760 analyzes the command data to derive the development time of each band, considers the time required to transfer the video signal of the previously-developed band data as the band development time for the current band, and sets up the band size so that the current band may be developed within that period of time.

However, the method of the prior art analyzes command data to derive the development time of each band, calculates the band development time which is the video signal transfer time of the previously-developed band data, compares the band development time with the video signal transfer time, and sets up the variable band size of each band. This method involves a large amount of processing to determine the band size, increasing the load of band size setup.

SUMMARY OF THE INVENTION

It is an object of the present invention to provide an image formation apparatus and method which adjust the height of each of the bands obtained by dividing a page, divide the drawing data for one page into bands for image development and transmission, allow a printer driver and a printer to perform concurrent operations efficiently, increase image development efficiency, prevent a waste of memory, and increase overall print efficiency.

An image formation apparatus according to the present invention comprises a list table storing therein a display list and a drawing position and a drawing area of the display list, the display list being an intermediate object containing information for creating image data recognizable by a printing unit performing printing, the drawing position and the drawing area corresponding to the display list; a display list creating unit receiving drawing instructions, one at a time, to create the display list and, at the same time, storing the drawing position and the drawing area of the display list into the list table; a distributing unit temporarily determining a band area size of each of a plurality of band areas generated by dividing one page after the display lists for one page are created, referencing the list table to calculate a total of drawing areas for the display lists included in the area, determining the band area size such that the total is equal to or smaller than a predetermined threshold, and creating information on the display lists belonging to the band area; an image developing unit developing the display lists belonging to each of the band areas to create the image data; and a transmitting unit transmitting the image data to the printing unit, one band area at a time.

According to this invention, the image formation apparatus temporarily determines the band area size of each of a plurality of band areas of a page, calculates the total of the drawing areas of the display lists for each of the plurality of band areas, and determines the band area size such that the total is equal to or smaller than the predetermined threshold. This simple processing allows the height of each of the bands of the page to be optimally adjusted.

Another image formation apparatus according to the present invention is the image formation apparatus described above, further comprising, a graphic list table for storing therein information on the drawing range of a special graphic requiring a long image-development time, wherein, when the created display list is the display list of the special graphic, the display list creating unit stores information on the drawing range of the display list into the graphic list table, and after the display lists for one page are created, the distributing unit temporarily determines the band area size of each of the plurality of band areas generated by dividing one page, references the graphic list table to check if the special graphic is included in the band area, determines a minimum band area size determined by a coordinate range in which the special graphic is present if the special graphic is included, references the list table to calculate the total of drawing areas of the display lists included in the band area and determines the band area size such that the total is equal to or smaller than a predetermined threshold if the special graphic is not included, and creates information on the display lists belonging to the band area.

The image formation apparatus according to this invention stores into the graphic list table the drawing range information on the display list of a special graphic requiring a long development time and, if the band area includes the special graphic, determines the storage range such that the storage range is the minimum range determined by the coordinate range in which the special graphic is present. Therefore, the image formation apparatus minimizes the size of the band area including the special graphic which requires a long operation time, makes the operation amount well-balanced among the bands, prevents the special graphic from being divided into a plurality of bands, and prevents image development efficiency from being degraded.

BRIEF DESCRIPTION OF THE DRAWINGS

FIG. 8 is a diagram showing an example of a graphic list table according to the present invention.

DESCRIPTION OF THE PREFERRED EMBODIMENTS

A first embodiment of the present invention will be described in detail.

Figure 1:
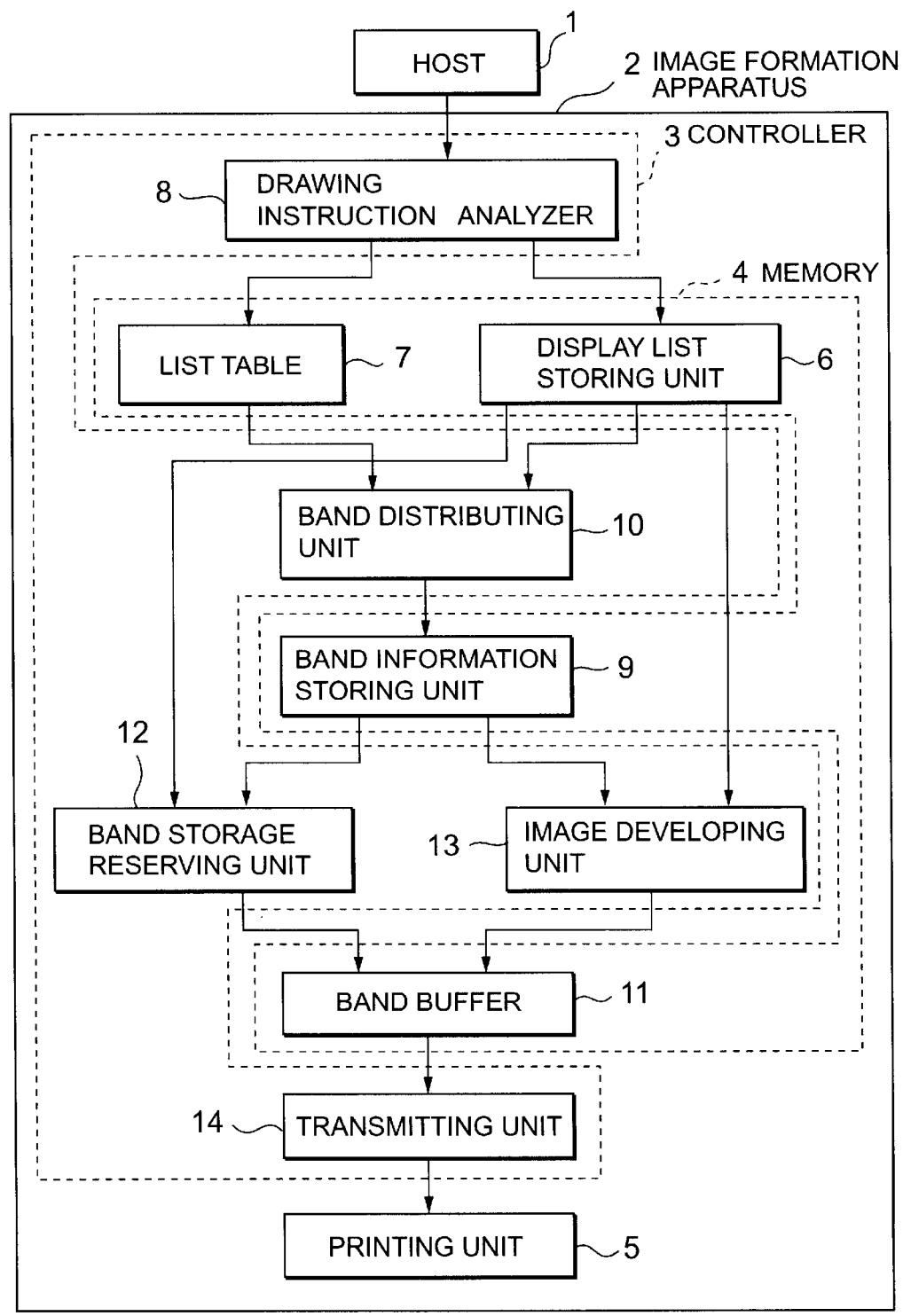
FIG. 1 is a block diagram showing the configuration of a first embodiment according to the present invention.

FIG. 1 is a block diagram showing the configuration of an image formation apparatus according to the present invention.

An image formation apparatus 2 comprises a controller 3, a memory 4, and a printing unit 5. The controller 3 receives a drawing instruction from a host 1, divides the drawing range of one page into a plurality of areas (bands), creates, for each band, the image data of a drawing instruction whose drawing position is included in the band, stores the created image data in the memory, and transmits the image data of each band. The memory 4 stores therein information necessary for the operation of the controller 3 and data created from the drawing instruction. The printing unit 5 prints image data output from the controller 3.

The controller 3 comprises a drawing instruction analyzer 8, a band distributing unit 10, a band storage reserving unit 12, an image developing unit 13, and a transmitting unit 14. The drawing instruction analyzer 8 analyzes a received drawing instruction to create an intermediate object (hereinafter called a display list) containing information on the position of the drawing image and the address of the image data, outputs the display list parameters which will be described later, stores the created display list in a display list storing unit 6, and stores the display list parameters in a list table 7 in the memory 4. The band distributing unit 10 references the list table 7 after one page of drawing data is sent from the host 1 and the drawing instruction analyzer 8 creates all display lists, determines the range of the Y-coordinate value of each band (hereinafter called a band height), based on the parameters stored in the list table 7 and considering the elements such as the density of drawing data, the difficulty of image development, and the number of effective colors, so that the image is developed efficiently, distributes the display lists, creates band information 25 indicating the result of display list distribution in each band, and stores the information in a band information storing unit 9. The band storage reserving unit 12 reserves a band buffer 11 of the minimum required size in the memory 4 based on the band information. The image developing unit 13 develops the display lists stored in the display list storing unit 6 into an image based on the band information. The transmitting unit 14 transmits image data from the band buffer 11 to the printing unit 5.

Figure 2:
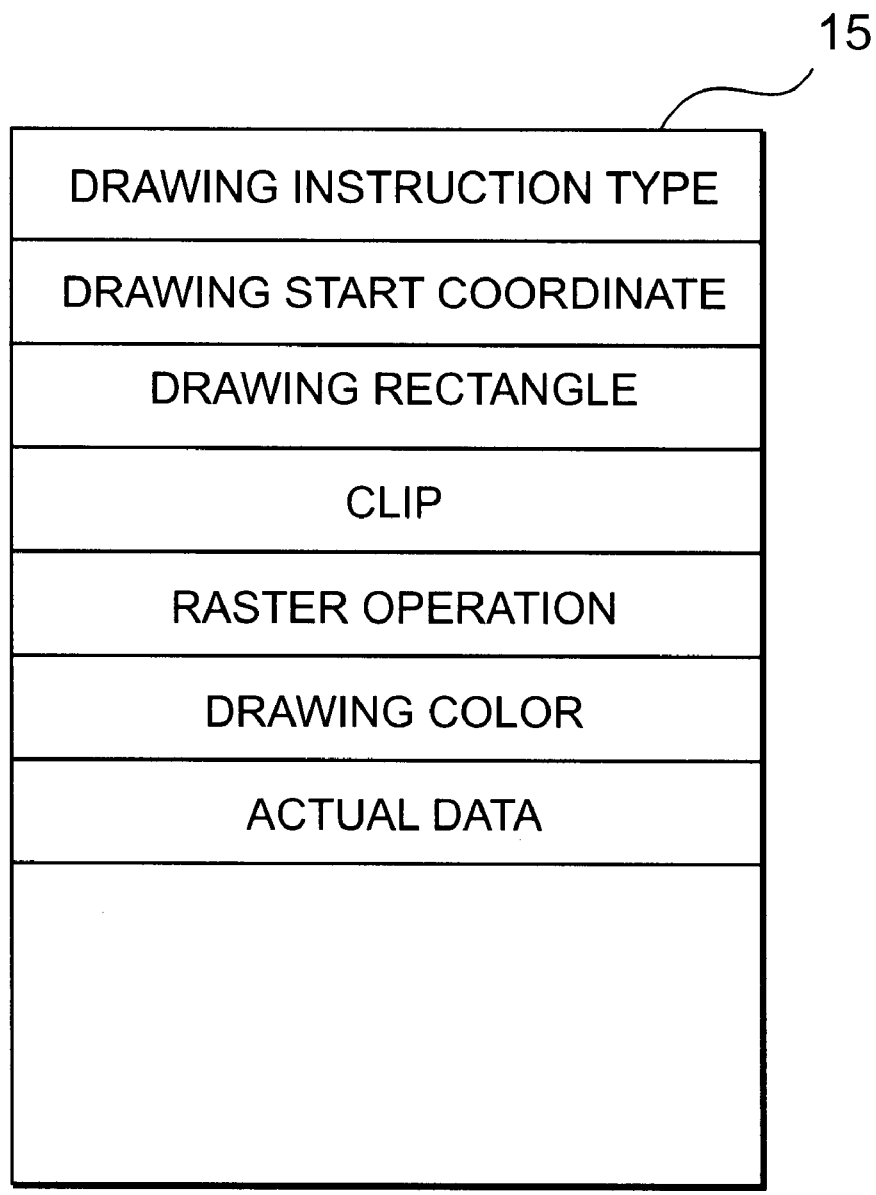
FIG. 2 is a diagram showing an example of a display list according to the present invention.

A display list 15 is an intermediate object produced by converting a drawing instruction sent from the host 1. As shown in FIG. 2, the display list 15 contains various parameters such as the drawing instruction type, the drawing position, the rectangle indicating the range to be drawn, the clip, and the raster operation, as well as information such as the drawing color and actual data. Each created display list 15 is linked to the display list 15 created immediately before and is stored in the display list storing unit 6.

The list table 7 stores therein information on the display lists 15 sorted in drawing position order, especially in coordinate value (hereinafter called the Y-coordinate value) order, of the print direction which is the paper transport direction.

Figure 3:
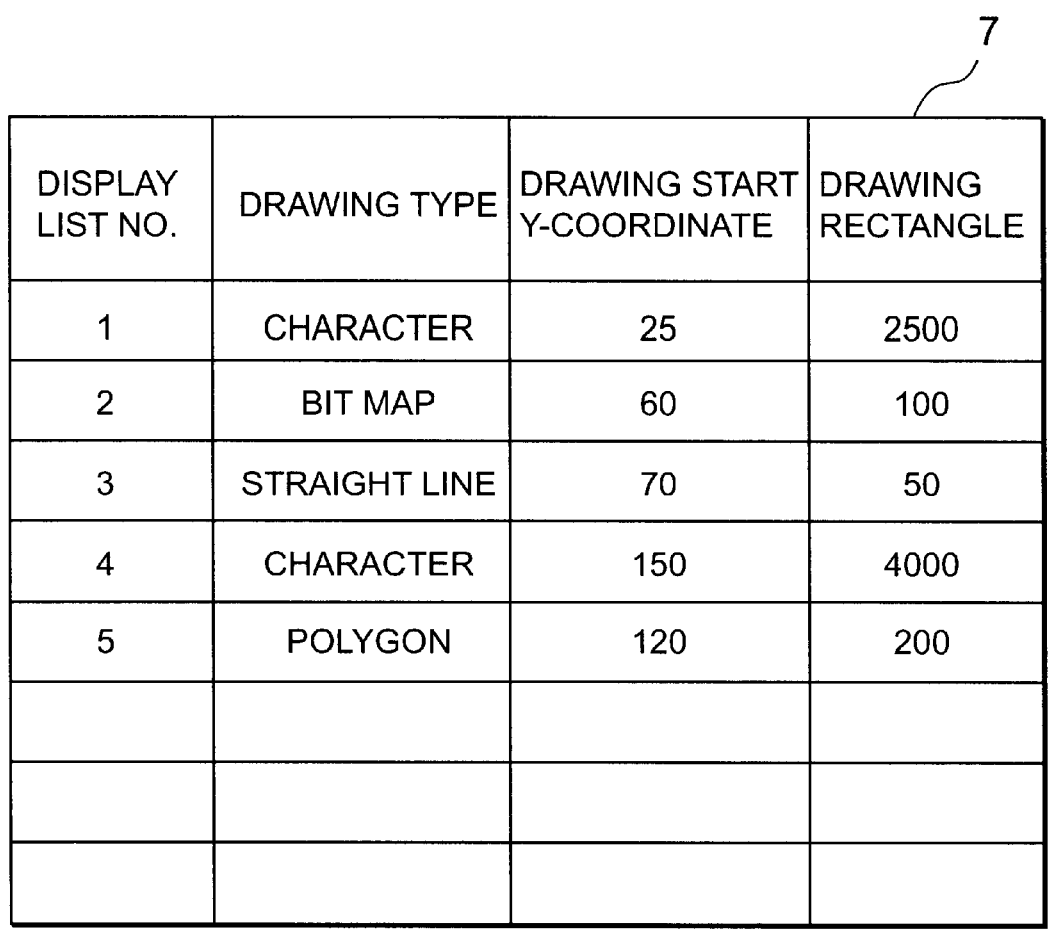
FIG. 3 is a diagram showing an example of a list table according to the present invention.

As shown in FIG. 3, the list table 7 is composed of the display list NO. field containing the order in which the display list was received, the drawing type field containing the type of data to be printed based on the display list, the drawing start Y-coordinate field containing the Y-coordinate of the top the rectangular area to be drawn, and the drawing rectangle field containing the size of the rectangular area to be drawn. The drawing type indicates the type of data to be drawn such as a bitmap image, character, or graphics such as lines or polygons.

Figure 4:
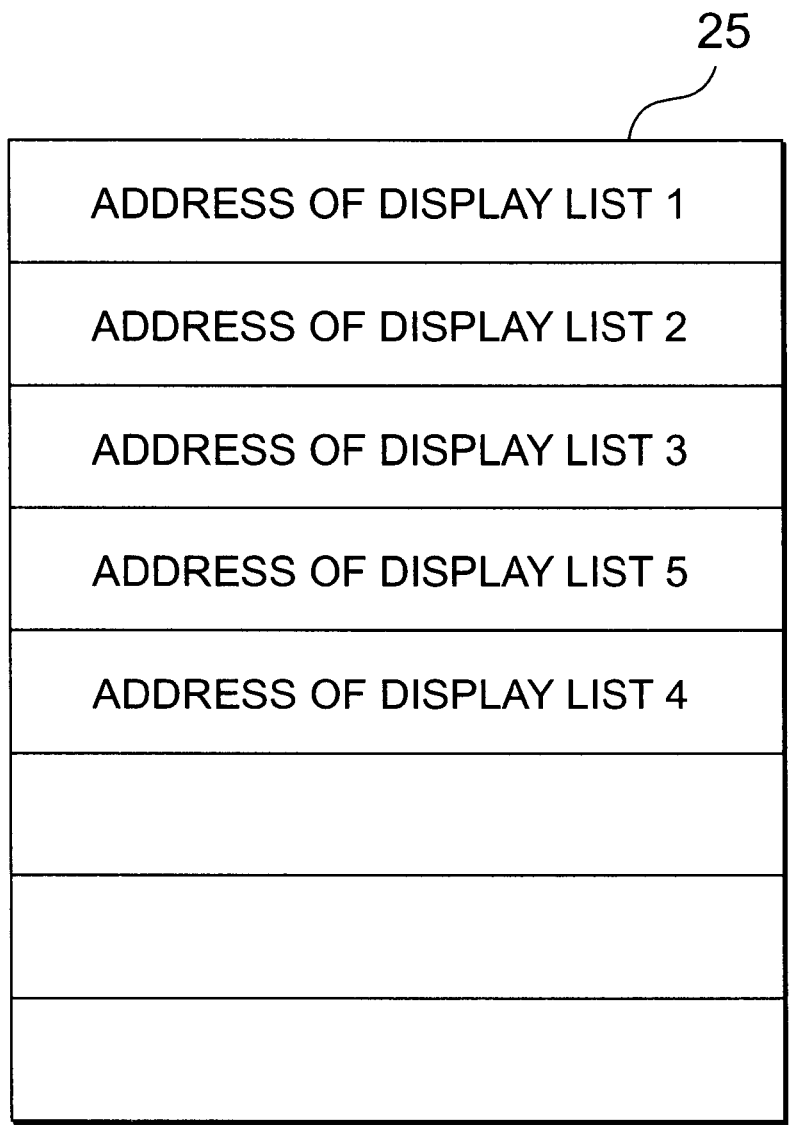
FIG. 4 is a diagram showing an example of band information according to the present invention.

Band information 25 contains address information on the display lists 15, as shown in FIG. 4. Tracing this address information allows the display lists 15 of each band to be obtained. The display list 15 extending across a plurality of bands is linked to by a plurality of bands; even in this case, only one display list 15 is stored in the display list storing unit 6.

Next, the operation of the first embodiment, from the reception of a drawing instruction to the transmission of one page of image data, will be described with reference to the drawings.

Figure 5:
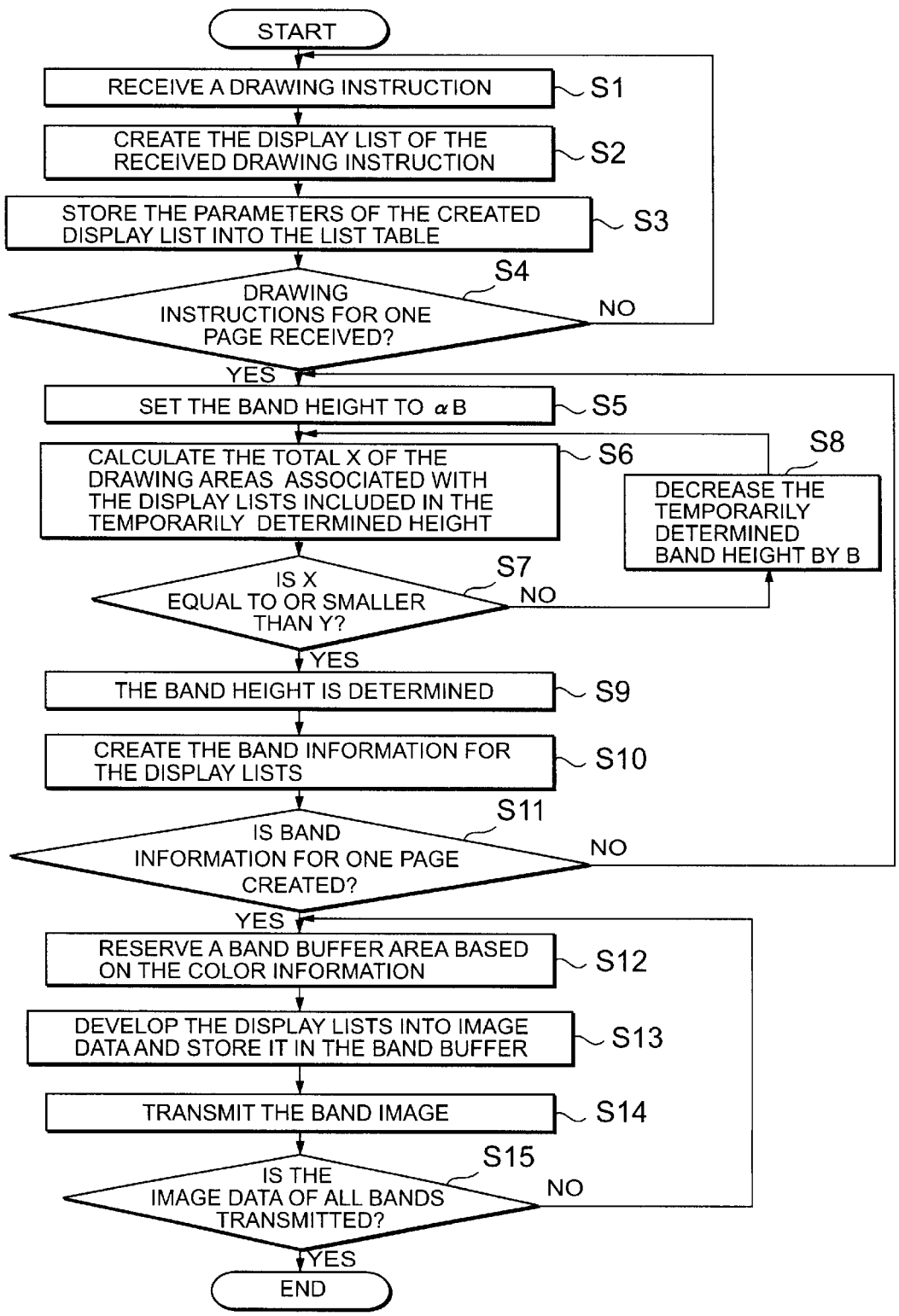
FIG. 5 is a flowchart showing the operation, from the reception of a drawing instruction to the completion of image data transmission, of the first embodiment according to the present invention.

FIG. 5 is a flowchart showing the operation from the reception of a drawing instruction to the transmission of one page of image data.

First, the drawing instruction analyzer 8 of the controller 3 receives a drawing instruction from the host 1, one at a time (step S1). The drawing instruction analyzer 8 analyzes the received drawing instruction, creates the display list 15 from the drawing instruction, and stores the display list 15 into the display list storing unit 6 (step S2). At the same time, the drawing instruction analyzer 8 stores the parameters of the created display list 15 into the list table 7 (step S3).

A check is made to see if the drawing instructions for printing one page of images have been received from the host 1 (step S4). If the drawing instructions for printing one page of images have been received and the display lists have been created for them, the band height is set temporarily to an integral ($\alpha$) multiple of B, where $\alpha$ is a predetermined integer and B is a band height increment unit (step S5). When the printing unit is a serial printer, B is preferably a width which can be drawn in one print head scan. For a band whose bottom exceeds the bottom of the page, the bottom of the page is assumed to be the bottom of the band.

Then, the total (X) of the drawing areas associated with the display lists 15 contained in the temporarily determined height is calculated (step S6). A check is made to see if X is equal to or smaller than a predetermined threshold value of Y (step S7). If X is larger than Y, the band height is decreased by B (step S8) and control is returned to step S6. If X is smaller than the threshold value of Y in step S7, the band height is determined to be the height at that time (step S9). For the band whose height is determined, the band distributing unit 10 creates band information using the display lists 15 contained in the band (step S10). A check is made to see if the band information necessary to print one page of images has been created (step S11). If not, control goes back to step S5 to repeat steps S5 to S10 to create band information for the next band. If it is found in step S11 that band information has been created for one page, the band storage reserving unit 12 checks the color information stored in the display lists 15 of a band and reserves a band buffer area in the memory 4 based on the band information (step S12). To do so, the band storage reserving unit 12 checks if the color information in the display lists 15 of the band contains information only for monochrome data. If so, the band storage reserving unit 12 reserves in the memory 4 a band buffer area that is one third as large as that for color data. Then, the image developing unit 13 reads the distributed display lists 15 from the display list storing unit 6 based on the band information stored in the band information storing unit 9, develops them into image data one at a time, and stores the developed image data in the band buffer 11 (step S13). Upon completion of image development of all display lists of the band, the transmitting unit 14 transmits the image data from the band buffer 11 to the printing unit 5 (step S14) to cause the printing unit 5 to start printing the image data. After transmitting the image data, a check is made to see if the display lists of all the bands of the page have been developed and the developed image data has been transmitted (step S15). If not, control is returned to step S12 to reserve a band buffer for the next band, develops the display lists of the band into image data, and transmits the image data. Processing for one page is completed when the display lists have been developed into image data and the developed image data has been transmitted for all bands.

In the conventional method, a display list is distributed to a band immediately after created, because the band height is fixed. In the embodiment according to the present invention, when a display list is created, only the parameters for the drawing position, drawing color, drawing type, and so on are stored in the list table but the display list is not distributed. After the display lists for one page are created, the height of each band of the page is determined by referring to the list table and the display lists are distributed to the bands.

This allows the band height to be changed according to the density of drawing data, the difficulty in image development, and so on, thus generating bands having sizes for efficient development.

In addition, the band storage reserving unit 12 used in the embodiment of the present invention reserves a band buffer for monochrome data. This band buffer is smaller than one third as large as that for color data, increasing memory utilization.

Next, a second embodiment of the present invention will be described.

Figure 6:
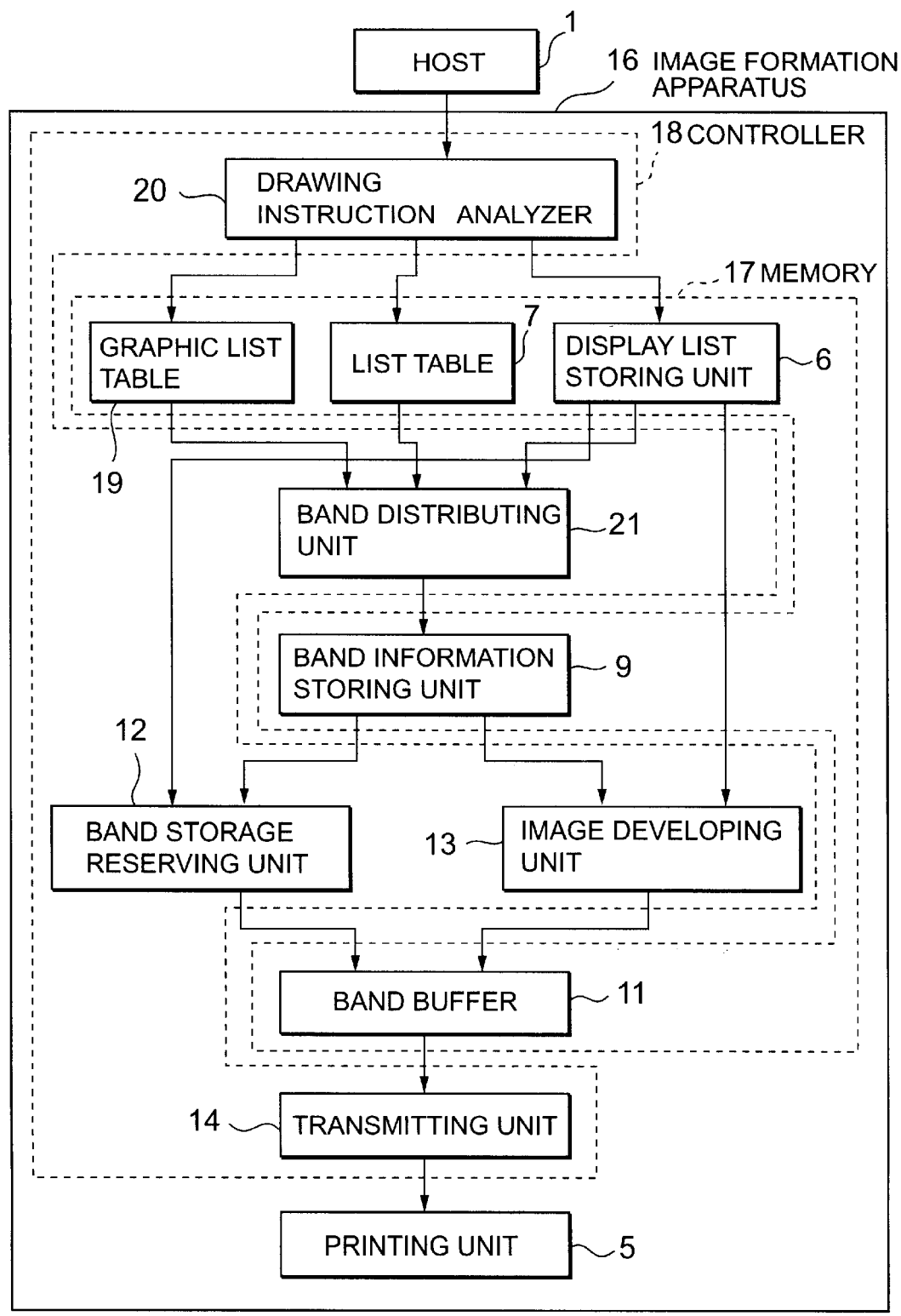
FIG. 6 is a block diagram showing the configuration of a second embodiment according to the present invention.

FIG. 6 is a block diagram showing the configuration of the second embodiment of the present invention.

An image formation apparatus 16 in this embodiment differs from that in the first embodiment in the following points. That is, the apparatus has a graphic list table 19 in a memory 17 for storing information on the drawing range of a special graphic having many drawing points such as a multiple-line graphic or a polygon. When creating a display list for a special graphic having many drawing points such as a multiple-line graphic or a polygon, a drawing instruction analyzer 20 of a controller 18 stores the coordinate range of the special graphic into the graphic list table 19. When the display list of a special graphic having many drawing points such as a multiple-line graphic or a polygon is included in a band, a band distributing unit 21 sets up the band height to a minimum which is within the range acceptable to the printing unit 5 and in which the drawing range is included.

The graphic list table 19 stores therein information on the Y-coordinate range in which a special graphic requiring a long image-development time is present. For example, as shown in FIG. 8, when the y-coordinate is included in the drawing range of a special graphic, the graphic presence flag corresponding to the y-coordinate is "1"; otherwise, the graphic presence flag is "0".

Performance of the image developing unit 13 depends on the type of a drawing instruction, that is, on the type of graphic the instruction is going to draw, such as a bitmap, character, rectangle, line, and polygon. This means that a lower band, if used for drawing data requiring a long development time, improves efficiency. Also, allocating drawing data including many drawing points, such as a multiple-line graphic or a polygon, to a plurality of bands takes long because clipping is performed in each band beginning with the first drawing point. The apparatus in this embodiment uses a lower band for a graphic requiring a long development time and, in addition, prevents the display lists of that graphic from being distributed to a plurality of bands.

Next, the operation of this embodiment, from the reception of a drawing instruction to the transmission of image data, will be described.

Figure 7:
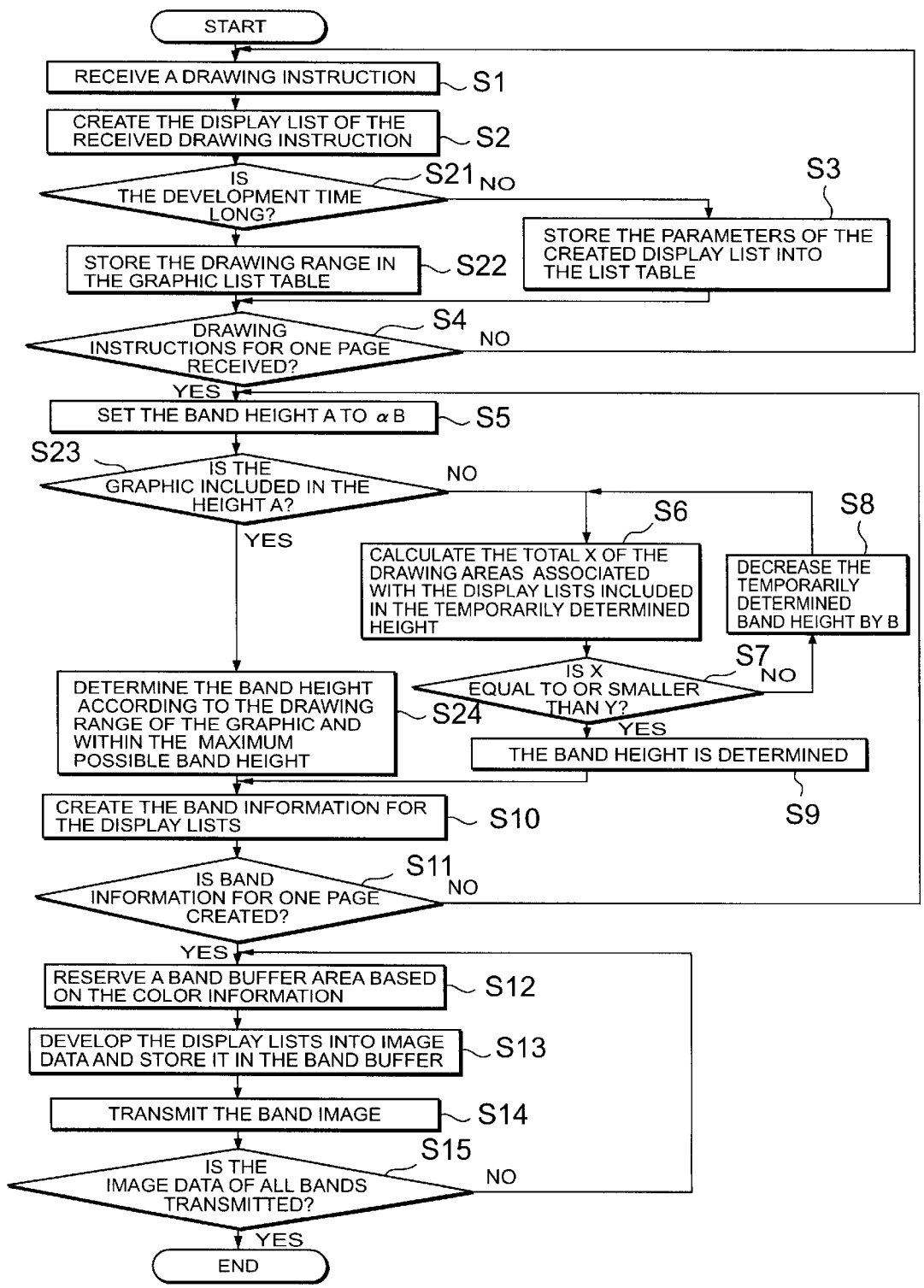
FIG. 7 is a flowchart showing the operation, from the reception of a drawing instruction to the completion of image data transmission, of the second embodiment according to the present invention.

FIG. 7 is a flowchart showing the operation executed in the second embodiment of this present invention, from the time a drawing is received to the time the image data for one page is transmitted.

After steps S1 and S2 are executed as in the first embodiment, a check is made to see if the created display list is that for a special graphic requiring a long image development time (step S21). If so, the drawing range of the graphic is stored in the graphic list table 19 (step S22). For example, the graphic presence flag corresponding to the Y-coordinate value is set to "1" in an example of the graphic list table shown in FIG. 8. If it is found in step S21 that the graphic development will not take long, step S3 in the first embodiment is executed to store the parameters of the graphic into the list table 7. Then, step S4 in the first embodiment is executed to check if all the drawing instructions to print one page have been received. If all the drawing instructions to print one page are not yet received, control is returned to step S1; otherwise, step S5 is executed. Then, the graphic list table is referenced to determine if the drawing range of a special graphic is within the band height temporarily determined in step S5 (step S23). If the range of the graphic is within the band height temporarily determined in step S5, the minimum band height is determined according to the drawing range of the graphic and within the range not exceeding the maximum possible band height (step S24). That is, when the drawing range of the graphic is completely within the temporarily-determined band height, the band height is decreased. Conversely, when the drawing range of the graphic overlaps with the temporarily-determined band height, the band height is increased by adjusting the bottom of the band to the bottom of the drawing rectangle in the y-coordinate direction. If the band height, when increased as described above, will exceed the maximum band height determined by the size acceptable by the printing unit 5, the bottom of the band is adjusted to the top of the drawing range of the graphic in the y-coordinate direction. If it is found in step S23 that the drawing range of the graphic does not overlap with the temporarily-determined band height, steps 6 to 9 in the first embodiment are executed to determine the band height based on the drawing area with reference to the list table 7. Steps 10 and S11 are executed. If the band information for one page is not yet created, control is returned to step S5. The band height is determined for the next band, and the band information is created. After the band information for one page is created, steps S12 to S15 are executed. The band buffer area is reserved for each band based on the color information, the display lists are developed into image data, and the band image is transmitted to the printing unit 5.

In this embodiment, for a drawing instruction that draws a graphic with many drawing points, the band height is determined so that the display list is allocated, not to a plurality of bands, but to one band. For a drawing instruction that draws a bitmap graphic, the display list is allocated to a plurality of bands. Determining the band height according to the type of drawing data in this way increases efficiency.

It takes a very long time to perform optimization calculation while considering the development time of drawing data each time it is developed. However, it is easy to determine whether a display list is to be divided into a plurality of bands or the band height is to be determined to include the display list in that band. This method makes the image development times evenly-balanced among bands and increases efficiency without increasing processing loads.

Next, a third embodiment of the present invention will be described.

Figure 9:
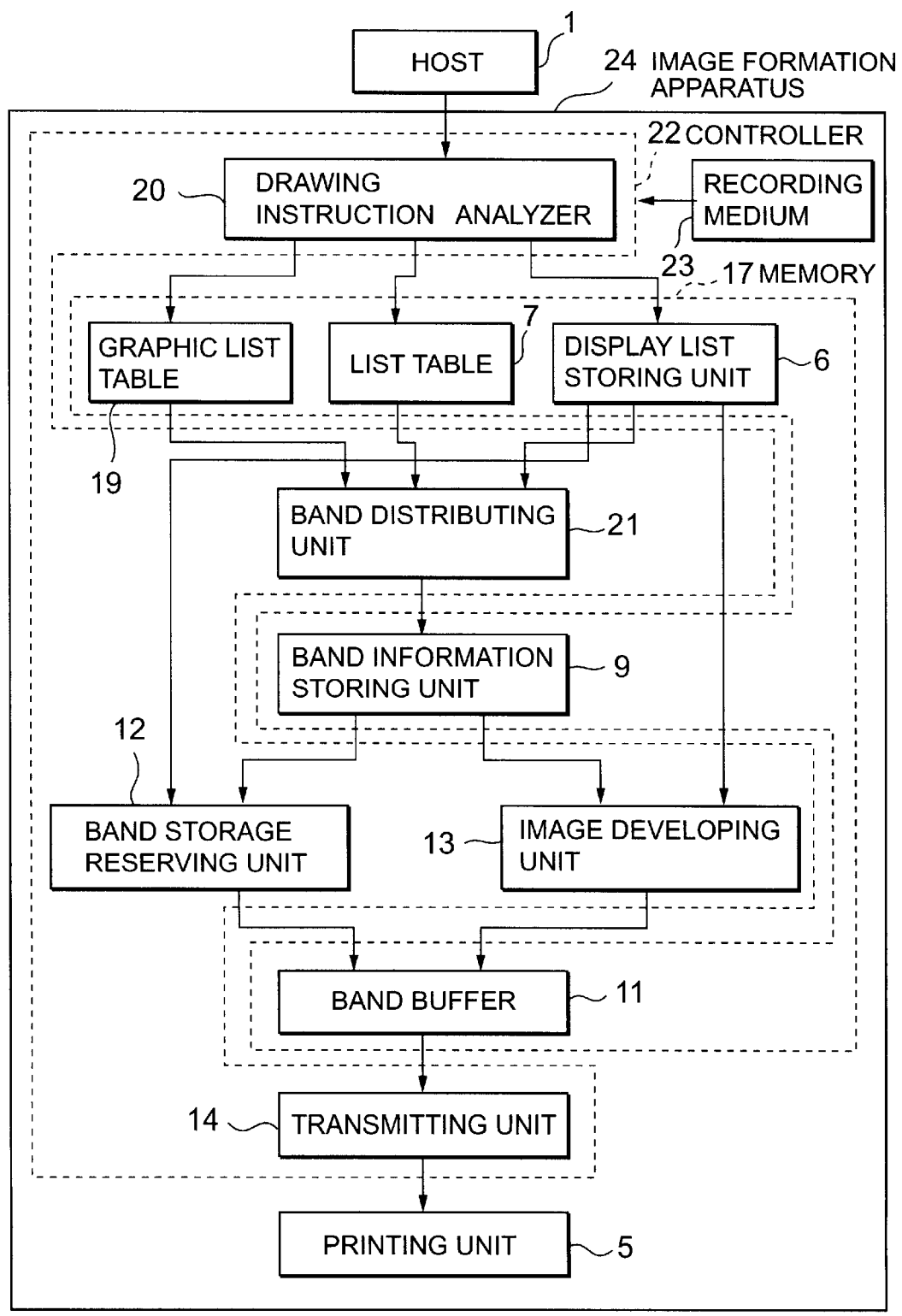
FIG. 9 is a block diagram showing the configuration of a third embodiment according to the present invention.

FIG. 9 is a block diagram showing the configuration of the third embodiment of the present invention.

In this embodiment, a controller 22, which is a computer, has a recording medium 23 storing therein a program which causes the controller 22 to develop drawing instructions, one band at a time, into image data and to transmit the developed image data to the printing unit 5. This recording medium 23 may be a magnetic disk, a semiconductor memory, an optical disc, or any other type of recording medium.

The program is read from the recording medium 23 into the controller 22 for executing the operation of the controller 22. The controller 22 executes, under program control, the same processing as in the controller 3 in the first embodiment or in the controller 18 in the second embodiment.

The controller 22 receives drawing instructions from the host 1, one at a time, and creates a display list from the received drawing instruction. Each time the controller 22 creates a display list, it stores the parameters of the display list into the list table 7 and, after the display lists for one page are created, references the list table 7 to temporarily determine the height of each band. The controller 22 calculates the total size of the drawing areas associated with the display lists included in the temporarily-determined band height and adjusts the band height so that the total is equal to or smaller than a predetermined threshold Y. Based on the determined band height, the controller 22 distributes the display lists to that band. In this way, the controller 22 distributes the display lists to a plurality of bands of one page. Then, the controller 22 stores the image data, generated by developing each band, into the band buffer 11, and transmits the image data from the band buffer 11 to the printing unit 5, one band at a time.

When a created display list is that of a special graphic requiring a long image-development time, the controller 22 stores the Y-coordinate range of the special graphic into the graphic list table 19. When the height of each band is determined after the display lists for one page are created, the controller 22 references the graphic list table 19 to check to see if each temporarily-determined band includes a special graphic. If the band includes a special graphic, the controller 22 determines the minimum band height according to the coordinate range; if the band does not include a special graphic, the controller 22 references the list table 7 to calculate the total size of each band and adjusts the band height so that the total is equal to or smaller than the threshold value of Y.

In the description of the first, second, and third embodiments, although the printing unit 5 only receives image data and prints it, it may have the function to develop display lists into image data. In this configuration, the display lists created by the controller are divided into a plurality of bands and transmitted to the printing unit 5 for printing in a usual operation. In case a plurality of bands each containing drawing data occur consecutively, the printing unit 5 and the controller develop the display lists into image data concurrently.

When a plurality of bands each containing a large drawing area occur consecutively even after the band height adjustment, the method described above allows the next band, which follows the band being developed by the controller, to be sent to the printing unit. The band sent to the printing unit 5 in this way is in the form of display lists not yet developed. Therefore, when the printing unit must wait long for a developed image because the drawing area is large, the printing unit can develop the next band into image data instead of waiting for developed data, thereby increasing print efficiency.

In many cases, the controller which functions as a computer that executes the above operation under control of a program has more memory than a printer which functions as a printing unit. Therefore, after the band heights of one page are determined, a check should be made too see if a plurality of drawing areas, each larger than a predetermined size, occur consecutively. If so, it is preferable to re-determine the band heights to cause the controller to develop high bands and to cause the printer to develop low bands.

In addition to the difference in memory size, the computer which runs under control of the program develops display lists more efficiently than the printing unit and, so, the printer takes longer to develop a polygon into image data. For this reason, it is preferable that a band including the drawing data of a polygon is developed only by the computer and that, considering the difference in development ability, the heights of other bands are re-determined to make the development times evenly-balanced among bands to enable the printing unit and the computer to execute image development concurrently.

This method maximizes the areas of the bands to be developed concurrently, allows any of the computer and the printing unit to be assigned freely to image development processing, ensures load balancing between the computer and the printing unit for better overall print efficiency, and improves printing efficiency.

What is claimed is:

1. An image formation apparatus, comprising:
   a list table for storing therein drawing positions and drawing areas of display lists, a display list being an intermediate object containing information for creating image data recognizable by a printing unit performing printing;
   a display list creating unit for receiving drawing instructions, one at a time, to create said display lists and, at the same time, storing the drawing position and the drawing area of said display lists into said list table;

a distributing unit for temporarily determining a band area size of each of a plurality of band areas generated by dividing one page after the display lists for one page are created, referencing said list table to calculate a total of drawing areas calculated corresponding to the display lists included in said band area, determining said band area size such that the total is equal to or smaller than a predetermined threshold, and creating information on the display lists belonging to said band area;

an image developing unit for developing the display lists belonging to each of said band areas to create the image data; and a transmitting unit for transmitting the image data to said printing unit, one band area at a time.

2. The image formation apparatus according to claim 1, wherein said printing unit prints one page by repeating a scan of a print head printing a predetermined width in one scan, and said distributing unit temporarily determines said band area size so as to be equal to a size corresponding to an integral multiple of a scan area scanned by said print head in one scan, references said list table to calculate the total of said drawing areas, and, if the total is larger than the predetermined threshold, decreases the band area size by a size corresponding to the scan area scanned by said printing head in one scan to determine said band area size such that the total of said drawing areas is equal to or smaller than said threshold.

3. The image formation apparatus according to claim 1, further comprising:

a drawing color checking unit for checking if a drawing color of the display lists belonging to said band area is monochrome only;

a band buffer for storing therein the image data developed sequentially by said image developing unit; and a storage reserving unit for reserving a minimum amount of storage required for the band buffer, based on the band area size and the drawing color of each of said band areas before said image developing unit develops the display lists belonging to the band area, said band buffer storing said image data therein.

4. The image formation apparatus according to claim 1, further comprising:

a graphic list table for storing therein information on the drawing range of a special graphic requiring a long image-development time, wherein, when a created display list is the display list of said special graphic, said display list creating unit stores information on the drawing range of the display list of said special graphic into said graphic list table, and after the display lists for one page are created, said distributing unit temporarily determines the band area size of each of said plurality of band areas generated by dividing one page, references said graphic list table to check if said special graphic is included in said band area, determines a minimum band area size determined by a coordinate range in which said special graphic is present if said special graphic is included, and creates information on the display lists belonging to said band area.

5. The image formation apparatus according to claim 4, wherein, if a part of the drawing area of said special graphic is included in said band area, said distributing unit checks if, when a bottom of said band area is adjusted to the bottom of the drawing area of said special graphic, said band area size exceeds a size receivable by said printing unit, determines the band area size such that the bottom of said band area is adjusted to the bottom of said special graphic if said band area size does not exceed a size acceptable by said printing unit, and determines the band area size such that the bottom of said band area is adjusted to a top of the drawing area of said special graphic if said band area size exceeds the size acceptable by said printing unit.

6. The image formation apparatus according to claim 4, further comprising:

a drawing color checking unit for checking if a drawing color of the display lists belonging to said band area is monochrome only;

a band buffer for storing therein the image data developed sequentially by said image developing unit; and a storage reserving unit for reserving a minimum amount of storage required for the band buffer, based on the band area size and the drawing color of each of said band areas before said image developing unit develops the display lists belonging to the band area, said band buffer storing said image data therein.

7. The image formation apparatus according to claim 4, wherein said printing unit prints one page by repeating a scan of a print head printing a predetermined width in one scan, and said distributing unit temporarily determines said band area size so as to be equal to a size corresponding to an integral multiple of a scan area scanned by said print head in one scan, references said list table to calculate the total of said drawing areas, and, if the total is larger than the predetermined threshold, decreases the band area size by a size corresponding to the scan area scanned by said printing head in one scan to determine said band area size such that the total of said drawing areas is equal to or smaller than said threshold.

8. An image formation method, comprising the steps of:

receiving drawing instructions, one at a time, to create display lists which are intermediate objects containing information for creating image data recognizable by a printing unit performing printing;

when each display list is created, storing into a list table a drawing position and a drawing area of said display list, said drawing position and said drawing area corresponding to said display list;

after the display lists for one page are created, temporarily determining a band area size of each of a plurality of band areas generated by dividing one page, referencing said list table to calculate a total of drawing areas of the display lists included in said band area, and determining said band area size such that the total is equal to or smaller than a predetermined threshold;

creating information on the display lists belonging to said band area;

developing the display lists belonging to each of said band areas for creating the image data; and transmitting the image data to said printing unit, one band area at a time.

9. The image formation method according to claim 8, further comprising the step of, if a created display list is a display list of a special graphic requiring a long development time, storing information on the drawing range of said display list into a graphic list table, wherein said step of determining the band area size comprises the steps of:

temporarily determining the band area size of each of the plurality of band areas generated by dividing one page;

referencing said graphic list table to check if said band area includes said special graphic;

if said band area includes said special graphic, determining the band area size such that the band area size is a minimum band area size determined by a coordinate range in which said special graphic is present; and if said band area does not include said special graphic, referencing said list table to calculate the total of said drawing areas of display lists included in said band area and determining said band area size such that the total is equal to or smaller than the predetermined threshold.

10. A computer-readable recording medium having stored therein a program which causes a computer to perform steps (a) to (f)

(a) receiving drawing instructions, one at a time, to create display lists which are intermediate objects containing information for creating image data recognizable by a printing unit performing printing;

(b) when a display list is created, storing into a list table a drawing position and a drawing area of said display list, said drawing position and said drawing area corresponding to said display list;

(c) after the display lists for one page are created, temporarily determining a band area size of each of a plurality of band areas generated by dividing one page, referencing said list table to calculate a total of drawing areas of the display lists included in said band area, and determining said band area size such that the total is equal to or smaller than a predetermined threshold;

(d) creating information on the display lists belonging to said band area;

(e) developing the display lists belonging to each of said band areas for creating the image data; and (f) transmitting the image data to said printing unit, one band area at a time.

11. A computer-readable recording medium having stored therein a program which causes a computer to perform steps (a) to (g):

(a) receiving drawing instructions, one at a time, to create display lists which are intermediate objects containing information for creating image data recognizable by a printing unit performing printing;

(b) when a display list is created, storing into a list table a drawing position and a drawing area of said display list, said drawing position and said drawing area corresponding to said display list;

(c) after the display lists for one page are created, temporarily determining a band area size of each of a plurality of band areas generated by dividing one page, referencing said list table to calculate a total of drawing areas of the display lists included in said band area, and determining said band area size such that the total is equal to or smaller than a predetermined threshold;

(d) creating information on the display lists belonging to said band area;

(e) developing the display lists belonging to each of said band areas for creating the image data;

(f) transmitting the image data to said printing unit, one band area at a time; and (g) if a created display list is a display list of a special graphic requiring a long development time, storing information on the drawing area of said created display list into a graphic list table, wherein said step of (c) comprises the steps of:

temporarily determining the band area size of each of the plurality of band areas generated by dividing one page;

referencing said graphic list table to check if said band area includes said special graphic;

if said band area includes said special graphic, determining the band area size such that the band area size is a minimum band area size determined by a coordinate range in which said special graphic is present; and if said band area does not include said special graphic, referencing said list table to calculate the total of said drawing areas of the display lists included in said band area and determining said band area size such that the total is equal to or smaller than the predetermined threshold.

* * * * *